United States Patent [19]

White et al.

[11] 3,712,771

[45] Jan. 23, 1973

[54] TRAVELING MOLD MECHANISM FOR FORMING PLASTIC ARTICLES

[75] Inventors: James C. White, Gladwin; Gene F. Emge, Bay City, both of Mich.

[73] Assignee: Koehring Company

[22] Filed: June 24, 1971

[21] Appl. No.: 156,333

[52] U.S. Cl. .....................425/126, 425/4, 425/127, 425/451
[51] Int. Cl. ..............................B29d 27/04
[58] Field of Search ........18/4 P, 4 B, 4 C, 5 P; 425/4, 425/817, 127, 451

[56] References Cited

UNITED STATES PATENTS

| | | | |
|---|---|---|---|
| 3,244,780 | 4/1969 | Levey et al. | 425/388 X |
| 2,806,252 | 9/1957 | Bishop | 425/468 X |
| 3,380,703 | 4/1968 | Zastrow | 249/172 |
| 3,426,388 | 2/1969 | Prohaska | 425/453 |
| 3,373,079 | 11/1968 | Eastman et al. | 425/350 X |
| 3,602,949 | 9/1971 | Kaut | 425/4 X |
| 3,464,182 | 9/1969 | Nichols | 425/109 X |

*Primary Examiner*—H. A. Kilby, Jr.
*Attorney*—Learman & McCulloch

[57] ABSTRACT

A mold system in which molds are indexed along a continuous circuit past stations at which: a deformable plastic sheet is first applied over the mold cavity or cavities; suction forces are applied to bring the sheet into the mold cavity or cavities; expandable plastic foam is applied to the formed sheet cavity; a backer is applied to close the cavity or cavities in which the expandable material is received; expansion and curing of the foam occurs; and finally the articles formed are unloaded. Each mold can be provided with a lid or closure which is opened at the unloading station and remains open until a backer or closure material is applied, at which time it is closed and locked. Preferably, the plastic sheet and backer material are drawn from continuous rolls and, following the closing of the mold top, the mold proceeds to a cutoff station where the plastic sheet and backer material are severed from the rolls thereof.

14 Claims, 8 Drawing Figures

PATENTED JAN 23 1973

INVENTORS
JAMES C. WHITE
GENE F. EMGE
BY
Learman & McCulloch

INVENTORS
JAME C. WHITE
GENE F. EMGE
BY
Learman & McCulloch 3,712,771

TRAVELING MOLD MECHANISM FOR FORMING PLASTIC ARTICLES

BACKGROUND OF THE INVENTION

Particularly in the furniture industry, it is desirable from an economic standpoint to provide formed rigid plastic parts with wood grain finishes to replace like wood parts having configured surfaces. Articles of the character which are being produced in the apparatus to be described, and according to the methods to be described, are useful as decorative panels for furniture. For example, such articles may incorporate configured raised and indented surfaces to simulate carved surfaces.

One of the prime objects of the present invention is to provide a system and method which reliably and economically forms articles, having a plastic outer skin and incorporating rigid foam, in a continuous cycle.

Another of the objects of the invention is to provide a method and apparatus for producing such plastic parts with relatively inexpensive traveling molds which permit and facilitate the removal of parts having undercuts from the molds.

A further object of the invention is to design a mod system wherein molds traveling in a continuous circuit, may form different parts of variant style and configuration.

Other objects and advantages of the invention will be pointed out specifically or will become apparent from the following description when it is considered in conjunction with the appended claims and the accompanying drawings, in which:

FIG. 1 is a schematic, top plan view, illustrating the steps which are followed to produce the article;

FIG. 2 is an enlarged, fragmentary, side elevational view, illustrating particularly the vacuum forming station and the mechanism for supplying the textured plastic sheet and the backer sheet to the apparatus;

Figure 4:
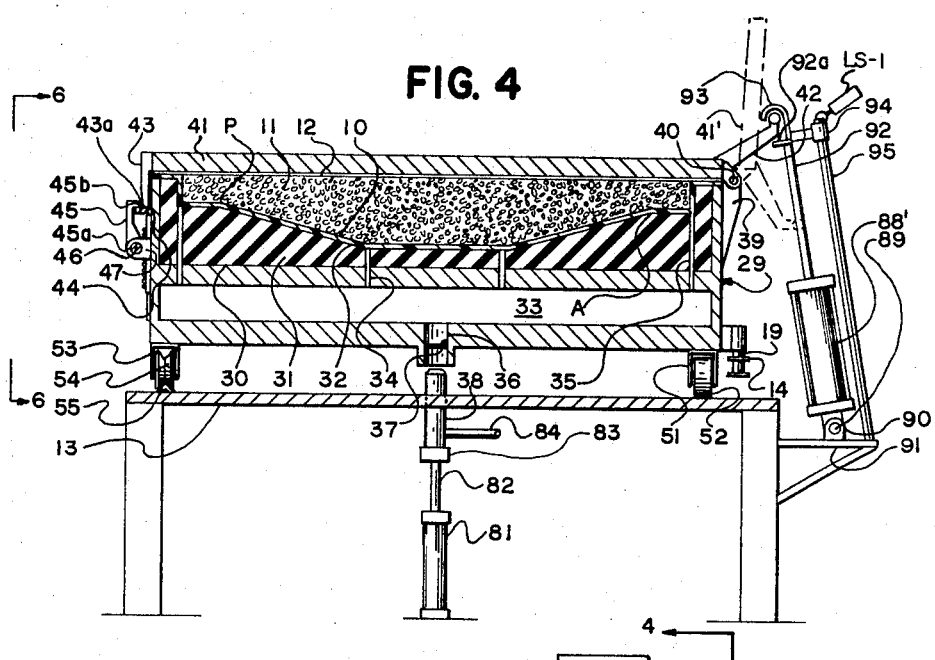
FIG. 4 is a reduced size, transverse sectional view, taken on the line 4—4 of FIG. 3.
Figure 3:
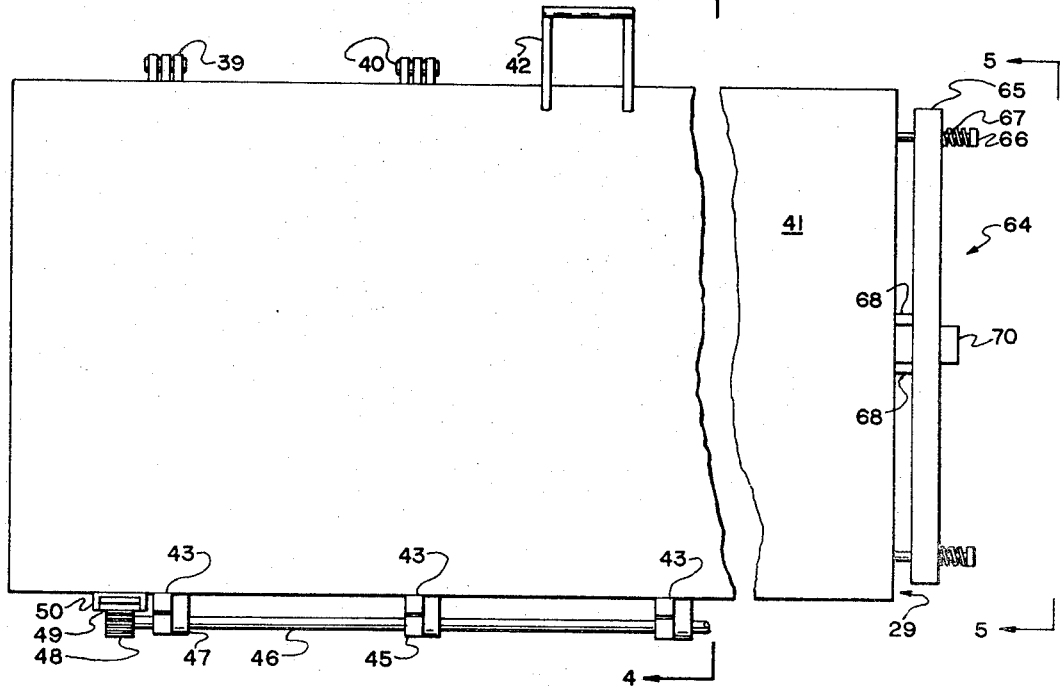
FIG. 3 is an enlarged, top plan view, particularly illustrating a traveling mold which is employed, the sheet clamping bar being shown in open or spread position.
Figure 5:
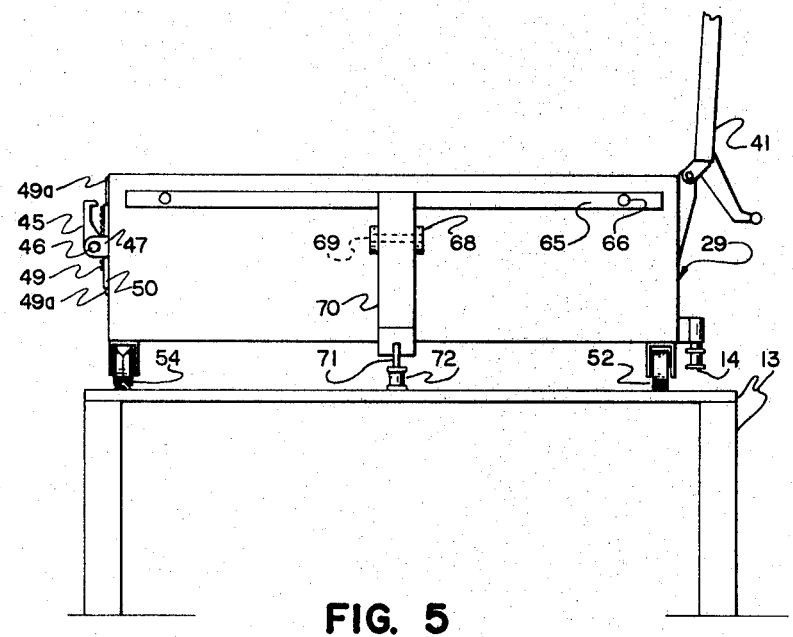
FIG. 5 is an end elevational view taken on the line 5—5 of FIG. 3.

Referring now more particularly to the accompanying drawings, and in the first instance to FIG. 4, the articles A to be formed each comprise a textured (for example, wood grained) plastic sheet about 0.005 of an inch in thickness molded to form a cavity, generally identified at 10, to be filled with a plastic foam 11 which expands to fill the cavity 10. Finally, a backer sheet 12 which may comprise simply a heavy paper, such as a "Kraft" paper is applied.

GENERAL DESCRIPTION

For a general description of the apparatus, attention is first directed to FIG. 1, wherein a support table 13 is shown for supporting a traveling mold system which comprises a series of molds M carried by an endless chain 14. The continuous chain 14 is trained around end sprocket members 15 and 16 mounted on vertical shafts 17 and 18, respectively, and one of the shafts 17 or 18 may be driven by a suitable electric motor M-1 (FIG. 8) through suitable conventional gear reduction and geneva mechanism to advance each mold M in increments of movement, separated by periods of dwell, a distance corresponding essentially to the distance $a$ (which comprises the length of a mold M plus the spaced distance maintained between adjacent molds M). Suitable geneva mechanism is illustrated in the book "Ingenius Mechanisms For Designers And Inventors" by Franklin D. Jones and published by The Industrial Press in New York City in 1930.

It is to be understood that each mold M is pivotally connected to the chain 14 only at its mid-point via pins 19 which connect to the links of the roller chain 14, at properly longitudinally spaced apart intervals. Stationarily provided along the frame 13 in succession are a plastic sheet applying station generally designated 20, a forming station generally designated 21, a plastic foam application station generally designated 22, a backer sheet applying station generally designated 23, a mold lid closing station generally designated 24, and a cutoff station generally designated 25. From station 25 the molds proceed in the direction of arrow $b$ to an initial curing station C and along an extended circuitous path which may be termed a curing station 26 until they reach a lid opening station 27, and an article unloading station 28.

THE TRAVELING MOLDS

Each of the molds M (see FIGS. 3 – 6) comprises a mold box, generally designated 29, which includes a mold receiving cavity 30 within which one or more elastomeric or synthetic rubber molds 31 is received to provide a part forming female mold cavity 32 or a series thereof. The material utilized to form mold 31 will, of course, be somewhat resilient in character. The mold cavity 32 is communicated with a vacuum manifold 33, provided in the lower portion of mold box 29, via ports 34 in mold box 29, and 35 in the mold 31. In its lower end or floor, each mold box 29 is provided with an opening or socket 36 normally closed by a gravity biased, off-set pivoted butterfly valve 37 adapted to be displaced by an insertable male vacuum applying plug member 38 in a manner which will later be described.

Figure 6:
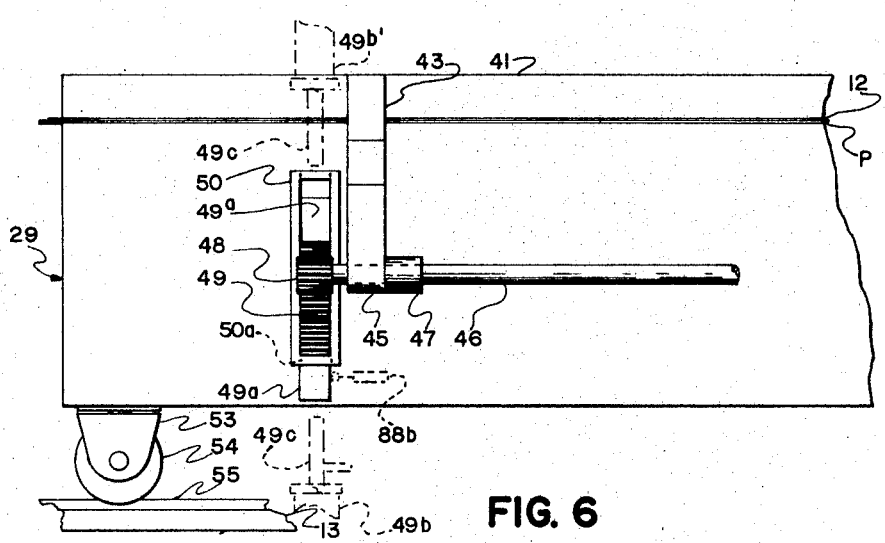
FIG. 6 is an enlarged, fragmentary, side elevational view taken on the line 6—6 of FIG. 4.
Figure 7:
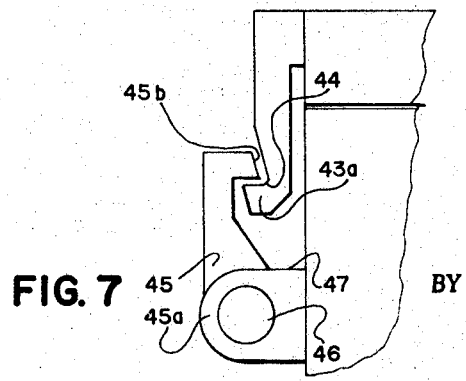
FIG. 7 is an enlarged fragmentary end elevational view of the lid latching mechanism.

Mounted on one side of each mold box 29 are support ears 39 for a hinge pin 40 on which a lid or cover 41 for the mold box 29 is provided. The cover 41 is fixed to the rod 40 which is rotatable in journals provided in the support ears 39. Provided on the rear edge of lid 41, for a purpose to be later described, is a handle-shaped lug member 42. THe opposite edge of the lid 41 includes an over-hanging front wall portion 43 and mounted thereon are hook-shaped members 43a (see FIG. 7) which provide latching channels 44, as shown. Provided to hook over the members 43a are a plurality of latches 45 mounted on a single pivot shaft 46 (FIG. 3), journaled in bearings or brackets 47 on box 29. Provided at one end of shaft 46 is an eccentrically mounted pinion gear 48, in mesh with a rack gear 49 traveling in a rack gear housing 50 (see FIG. 6) and having extending non-toothed end portions 49a passing through slots 50a provided in the end walls of housing 50. A double acting, solenoid operated, air cylinder 49b' having a piston rod 49c engaging the lower gear end 49a is provided at station 27 and a double acting, solenoid operated, air cylinder 49b having a piston rod 49c engaging the upper gear end is provided at station 24. For the sake of convenience, both cylinders 49b and 49b' are schematically shown in FIG. 6.

The manner in which gear 49 is moved upwardly and downwardly will later be described. For present purposes, however, it should be understood that the purpose in providing the eccentrically mounted gear 48 is to bind the parts in a condition in which latches 45 have been swung inwardly sufficiently to bear upon the channel surfaces 44. As FIG. 7 indicates, the surfaces 45b of the latches 45 are cam surfaces so that, when the lid 41 is dropping into place, the hook parts 43a may move past the latches 45 (which rock outwardly) to the position shown in FIG. 7. Each mold box M mounts clevises 51 for flat surfaced mold supporting inner rollers 52, and clevises 53 for the outer grooved rollers 54 which travel in V-tracks 55 provided for them on the table 13.

The pre-printed, wood grain, plastic (for instance, vinyl) sheet P is supplied on a rotatable double roll assembly, generally designated 56, (FIG. 1) which is pivotally received in a central post member 57 (FIG. 2). Each assembly 56 may comprise a vertical rod section 58 received in the pipe 57 and mounting a pair of laterally projecting hanger rods 59 on which sheet rolls 60 and 61 of material P are rotatably received. The sheet material P is utilized only on one side of the circuit and, when the supply of material 60 at one side is used up, the pipe 58 may be swung 180° to dispose the supply of material 61 in position to be used. While roll 61 is in use, a new roll of material may be loaded in place of former roll 60.

Provided at station 20 on a bracket 62, fixed to the table 13 is a transversely extending guide roller 63 (FIG. 2) which extends across the top of a mold M (which has its lid 41 lifted at this stage). Provided on the front end of each mold box 29 is mechanism, generally designated 64, (see FIG. 3) for clamping the leading edge of the sheet P to the lead mold M. The assembly 64 includes a clamp bar 65 (FIG. 3), mounted on elongate bolts 66 which extend outwardly from the front end of box 29. Springs 67, provided on the bolts 66, tend to normally force the member 65 toward the mold box 29, but permit it to move outwardly on bolts 66 when the clamp member 65 is forced outwardly. Ears or brackets 68 (FIG. 5) provided on each mold box M, under clamp bar 65, support a pin 69 which pivotally mounts a rocker arm 70 depending from bar 65 and adapted to be engaged by the piston rod 71 of a double acting, solenoid operated, air cylinder 72 provided at the station 20 for separating the bar 65 from the front of the mold box 29, and at this time an operator grasping the leading edge of sheet P, can position it between the clamp bar 65 and mold box, and release cylinder 72 to permit the sheet P to be clamped therebetween.

When the mold box M is then indexed one increment a to dispose it at forming station 21, it pulls the sheet P with it, which then covers the mold box 29 when the latter is disposed at the forming station 21. FIG. 2 particularly illustrates the forming station which includes rapid heating, quartz heaters 73 mounted on a frame bar 74 to dispose them above the open top of a mold box M at the station. Frame bars 74 are supported by a frame part 75 which mounts a sheet clamp frame, generally designated 76, for vertical movement. Clamp frame 76 including vertical bars 77 and plastic sheet, edge clamping bars 78, which extend along the top side edges of the mold box M at the forming station to hold the sheet P in place during the forming operation. The clamp bar member 76 is raised and lowered by a double acting, solenoid operated air cylinder 79, having its piston rod 80 connected to the frame 76.

Provided at the forming station 21, and also at stations 22, 24 and the initial cure station C, immediately downstream from cutoff station 25, are tubular male members 38 which, as indicated, are insertable into the openings 36 provided in the floor of each mold box 29. Double acting, solenoid operated air cylinders 81 (FIG. 4), having piston rods 82 connected to plates 83 from which the pipes 38 extend, are provided at each of stations 21, 22, 24 and C to move the pipes 38 into and out of inserted position. Lines 84 are provided to communicate each pipe 38 with a suitable source of vacuum, such as a vacuum manifold or vacuum pump. The cylinders 81 at stations 22, 24 and C permit the desired vacuum forces in chambers 33 to be maintained until the plastic foam 11, which is inserted at station 22, is fully expanded to prevent distortion of the article being formed.

At station 22, the operator pulls down a hose H, having a manually operable shut-off valve V, for supplying the foam material and utilizes it to fill the cavity 11 in the manner indicated.

When the lead mold is at station 22, the operator inserts the leading edge of the backer material 12 between the clamp bar 65 and front of mold box 29, following operation of a cylinder 72', identical to cylinder 72, at station 22 to move the clamp bar 65 outwardly. Backer material 12 is provided on a roll 85, journaled on a shaft 86 provided on a support post 87.

At station 25, the operator may manually sever the sheets P and 12, or may utilize a pendulum knife K actuated by a double acting, solenoid operated air cylinder 100, which moves transversely between the mold boxes M to sever them and then returns to original position.

Thereafter, the mold boxes M move in a path in which the foam 11 cures and becomes rigid. At station 27, and at station 24, double acting, solenoid operated air cylinders 88 and 88' (FIG. 4) are provided respectively, each being pivotally mounted at 89 on a bracket 90 provided on a support platform 91 affixed to table 13. The piston rod 92 of each cylinder has a hook-shaped member 93 provided at its upper end to engage over the lug 42. Upon the retraction of rod 92 of cylinder 88 at station 27, the lid 41 will be raised to the open position (shown at 41' in FIG. 4). A guide 94, fixed to each hook member 93, slides on a guide rod 95 to guide the hook in its path of travel as indicated. Once the lid 41 has been raised to the position illustrated at 41' at station 27, the operator can reach in to grasp the article formed, and remove it from the elastomeric mold 31. Because the mold is flexible, any undercut portions of the article formed are readily removed.

THE ELECTRICAL CONTROL CIRCUIT

Figure 8:
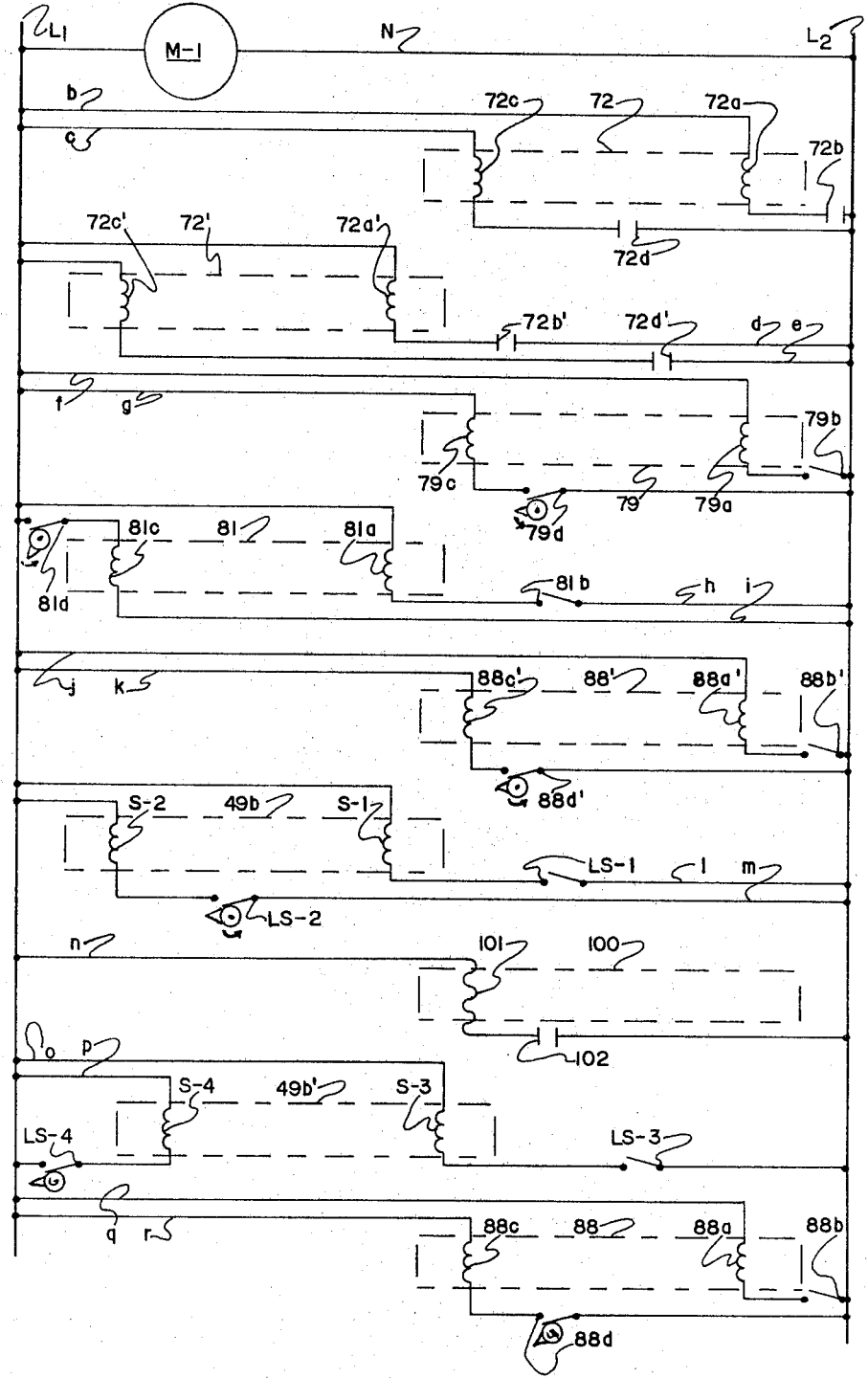
FIG. 8 is a schematic view of a typical electrical control circuitry.

A typical electrical control circuit is illustrated in FIG. 8 and includes the motor M-1 for continuously driving the chain 14 through suitable geneva mechanism in a circuit line *a*. A circuit line *b* incorporates the advance solenoid 72*a* and contacts 72*b* which are closed when a foot pedal, operated by the operator is pushed downwardly. A circuit line *c* includes the retract solenoid 72*c* for cylinder 72 and contacts 72*d* which are closed when the foot pedal is permitted to return to original position. A circuit line *d* incorporates the advance solenoid 72*a'* for the cylinder 72' and a circuit line *e* includes the advance solenoid 72*c'* for the cylinder 72', there being contacts 72*a'* closed when the foot pedal operated by the operator is depressed and contacts 72*d'* which are closed when the spring returned pedal is released.

Provided in a circuit line *f* is the advance solenoid 79*a* for cylinder 79, operated when a limit switch 79*b* is operated by the particular mold moving into station 21. A circuit line *g* includes the retract solenoid 79*c* and a timer cam-operated switch 79*d* which operates to retract piston 80 just before the particular mold is ready to leave station 21. Provided in a circuit line *h* is the advance solenoid 81*a* for cylinder 81 in circuit with a limit switch 81*b* activated when a mold has arrived at station 21. Provided in a circuit line *i* is the retract solenoid 81*c* of cylinder 81 in circuit with a timer cam-operated switch 81*d* which closes just before the mold at station 21 is ready to leave it. There is also a cylinder 81 at each of the following three stations, and it is to be understood that they operate simultaneously and that each may include an advance and retract solenoid 81*a* and 81*c* respectively in lines *h* and *i*, respectively.

Provided in a circuit line *j* is the advance solenoid 88*a'* for cylinder 88' in circuit with a limit switch 88*b'* which is closed when the mold moves to closing station 24. Provided in circuit line *k* is the retract solenoid 88*c'* of cylinder 88' in circuit with a timer cam-operated switch 88*d'* which closes after a particular mold M has left station 24 and just before the next one arrives.

Provided in a circuit line *l* is the advance solenoid S-1 of cylinder 49*b* in circuit with a limit switch LS-1 operable when lid 41 has been closed (see FIG. 4). In circuit line *m*, the retract solenoid S-2 for cylinder 49*b* is in circuit with a timer cam-operated switch LS-2 for retracting the piston rod of cylinder 49*b* prior to the time the mold M is to be moved from station 24. Provided in a circuit line *n* is the advance solenoid 101 for the cutoff knife cylinder 100 in circuit with a limit switch 102 which indicates that the mold M has reached the initial cure station C just beyond cutoff station 25. Provided in a circuit line *o* is the advance solenoid S-3 of cylinder 49*b'* in circuit with a limit switch LS-3 which is closed when the particular mold arrives at lid opening station 27. Provided in a circuit line *p* is the retract solenoid S-4 of cylinder 49*b'* provided in circuit with timer cam-operated switch LS-4 for returning the piston rod of cylinder 49*b'*.

Finally, provided in a circuit line *q* is the advance solenoid 88*a* for cylinder 88 in circuit with a limit switch 88*b* operated when engaged by the piston rod of cylinder 49*b'*. Provided in circuit line *r* is the retract solenoid 88*c* of cylinder 88 in circuit with a timer cam-operated switch 88*d* for restoring the piston rod of cylinder 88, once the particular mold M has moved beyond the lid opening station 27 and before the next mold reaches it. Each of the timer cams 79*d*, 81*d*, 88*d'*, LS-2, LS-4 and 88*d* are, of course, driven in timed relation with motor M-1. Those limit switches which are operated via being engaged by one of the parts of the system, such as a mold M, may be of the type which are opened automatically after a timed interval coinciding with energization of their counterpart retract solenoids. While other electrical control circuits may be used, and in fact may be, it is to be understood that FIG. 8 demonstrates a typical system which may be utilized, if desired.

THE OPERATION

In operation, the molds M proceed from the unload station 28 to the plastic sheet P applying station 20. To initiate a cycle, the cylinder 72 is operated to pull clamp bar 65 away from the front end of the mold box at the station between stations 28 and 21. The operator then inserts the leading edge of plastic sheet P between bar 65 and box 29 and releases the cylinder 72 which may be foot pedal operated, for instance. With the next indexing movement of the said mold box M, it is disposed at the forming station 21 where cylinder 79 is operated to bring the clamp bars 78 down to clamp the sheet against the upper edge surfaces of the sides of mold box 29. The plastic P is substantially instantaneously heated to a deformable temperature by heaters 73 and sags into the mold cavity 10. Just after the particular mold box arrives at station 21, the double acting cylinder 81 is operated to move the male pipe member 38 up into its opening 36, which displaces the butterfly valve member 37 sufficiently to communicate the vacuum hose 84 with the vacuum manifold 33. This creates a differential pressure which moves the plastic P down into the mold cavity 32 provided in the elastomeric mold part 31. Cylinder 81 is then operated to withdraw vacuum pipe 38.

Thereafter, the mold system indexes again and the lead mold is disposed at the foam applying station 22, where, as previously indicated, the operator fills it with foam material from a flexible hose H which can be pulled down to enter the box 29. Movement of the mold to foam applying station 22 also draws the sheet P over the following open mold box which has been drawn to forming station 21. The foam material does not expand immediately. Accordingly, when the operator has filled the cavity 10, he then grasps the backer paper 12 and, via a cylinder 72' at this station, again moves clamp plate 65 on the front of the lead mold box outwardly from the front wall of the mold box. He then also clamps the leading edge of the backer paper 12 therebetween by releasing the foot pedal operating cylinder 72'. When the mold box arrives at station 22, a male vacuum applying member 38 at this station is immediately moved onto socket 36 via a cylinder 81 at the station to maintain suction forces therein. Prior to indexing, the member 38 at the forming station 22 is withdrawn.

The lead mold M then indexes to station 24. Shortly after arrival at station 24, the cylinder 88' moves its piston rod with plate 92*a* upwardly to engage the lug 42 and close the lid 41. The cylinder 88' is in all respects similar to cylinder 88 and mounts a hook 93 which holds the lid sufficiently during its downward travel to prevent its slamming down. When the lid 41 reaches down position, members 43a cam latches 45 outwardly enough momentarily to permit entrance and dispose the parts in the positions shown in FIG. 7. Thereafter, cylinder 49b is operated to move rack 49 downwardly and rock latches 45 inwardly to lid clamping position. When the particular mold box arrives at station 24, a male vacuum applying member 38 at this station is immediately moved into socket 36 via a cylinder 81 at the station to maintain suction forces therein. Prior to indexing the mold, the member 38 at the station 24 is withdrawn. When the mold M at station 24 is then indexed an increment forwardly to the initial curing station C, it draws the backer sheet 12 forwardly over the open mold box immediately behind it, which is moving from station 22 to station 24.

When the mold box arrives at the initial cure station, a male vacuum applying member 38 at this station is immediately moved into socket 36 via a cylinder 81 at the station to maintain suction forces therein. Prior to indexing, the member 38 at this station is, of course, withdrawn. With vacuum forces maintained in the mold boxes the expanding pressure of the foam material does not, in any way, by applying uneven forces, create distortions in the part being formed. At station 25, between stations 24 and C, the transversely swingable, spring returned guillotine knife K is operated by cylinder 100 to sever plastic sheet P and backer sheet 12.

It should be understood that the clamp bar 65 need be operated for the purpose of inserting plastic sheet P and backer sheet 12 at stations 21 and 23 only for the first mold M in a particular cycle of operation. The machine operates thereafter automatically, in the sense that no additional clamping is necessary until the supply rolls of sheet P or 12 need replacement. Even though cutoff of the material occurs at station 25, the closing of the lids 41 at station 24 operate to clamp the sheet between the lid 41 and mold box top.

The plastic sheet P typically is a polyvinyl chloride sheet and the foam material 11 may typically be a compatible foam which will adhere to the sheet P for instance a polyvinyl chloride foam which cures to form a hard, rigid foam. Many sheets and foams may be used. For instance, the sheet P may be polyethylene or polypropylene and the foam may be polyurethane, polyether, or phenolic foam. During their lengthy passage from he initial cure station to lid opening station 27, the foam material 12 cures and rigidifies. At station 27, the lower end 49a of gear 49 is engaged by the piston rod 49c' of cylinder 49b' at station 27 and is moved upwardly to unlock the eccentrically clamped parts and swing the latches 45 outwardly immediately thereafter. The cylinder 88 at the lid opening station 27 is only then operated to retract the piston rod 92 from the position in which it is shown in FIG. 4 to swing the lid 41 upwardly and dispose it in the open position indicated at 41' in FIG. 4. When the mold M, with its lid now open, is thereafter indexed to station 28, the article may be readily manually removed by the operator. Because the eccentric pinion gear 48 effectually wedges the lid 41 down in position, the expanding pressure of the foaming agents in the foam plastic material cannot in any way distort the article being formed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for forming articles with differential pressure formed synthetic plastic sheet outer skins filled with synthetic plastic foam material comprising: a series of molds having mold cavities therein; means for indexing said molds in a continuous path of travel, interrupted by periods of dwell, in a circuit which includes an unloading station at which articles are removed from said molds; a sheet supplying station downstream from said unloading station past which said molds are moved; vacuum source means downstream in the circuit therefrom for releasably coupling a vacuum source to said molds to draw the sheet into the mold cavities of said molds and form sheet cavities therein; means downstream from said latter means for supplying said foam material to the sheet cavities formed while the formed sheet is in the mold cavities; and closure applying means for applying a closure to permit said foam material to expand only to a predetermined degree, as it cures on its way to said unloading station.

2. The combination defined in claim 1 in which said molds incorporate lids, movable to and from open positions removed form he mold cavities to positions closing the mold cavities, which comprise said closure.

3. The combination defined in claim 2 in which means, past which said molds are circulated, is provided for locking said lids in closed position after foam material has been supplied to the cavities.

4. The combination defined in claim 3 in which means, past which said molds are circulated, is provided at said unloading station for unlocking said lids.

5. The combination defined in claim 2 in which means, past which said molds are circulated, is provided for closing said lids after foam material has been applied to he cavities.

6. The combination defined in claim 2 in which means, past which said molds are circulated, is provided for opening said lids at the unloading station.

7. The combination defined in claim 1 in which means is provided for applying a backer sheet to the top of said mold cavities after the foam material has been supplied thereto.

8. The combination defined in claim 1 in which releasable clamp means is provided on at least one of said molds at the front thereof for receiving the leading end of a plastic sheet.

9. Apparatus for forming articles with differential pressure formed synthetic plastic sheet outer skins filled with synthetic plastic foam material comprising: a series of molds having mold cavities therein; means for indexing said molds in a path of movement, interrupted by periods of dwell, in a path which includes unloading and reloading station means past which said molds are moved; means for creating a differential pressure in said cavities to draw the sheet into the mold cavities of said molds and form sheet cavities therein; means for supplying an expandable foam material to the sheet cavities formed at a foam supplying station removed from said station means while the formed sheet is in the mold cavities; and means for containing the expansion of said foam material on its way to said station means.

10. The combination defined in claim 9 in which said latter means comprises swingable lids movable to and from open positions removed from the mold cavities to positions closing the mold cavities, said circuit including a station with a power cylinder operated hook member which permit movement of the molds past it out of the station for engaging said lids and moving them to closed positions.

11. The combination defined in claim 10 in which said molds incorporate latches for locking the lids in closed position operable after said lids have been closed; and in which power cylinder means, past which said molds are circulated, is provided for operating said latches to lock said lids in closed position after foam material has been supplied to the cavities.

12. The combination defined in claim 11 in which power cylinder means, past which said molds are circulated, is provided at said station means for engaging and operating said latches to unlock said lids.

13. The combination defined in claim 12 in which a power cylinder operated hook member, past which said molds are circulated, is provided for engaging and opening said lids at said station means after said latches have been operated to unlock the lids.

14. The combination defined in claim 10 in which means is provided for applying a backer sheet to the top of said mold cavities after the foam material has been supplied thereto and before said lids are closed; and releasable clamp means is provided on at least one of said molds at the front thereof for receiving the leading end of a plastic sheet.

* * * * *